US012578682B2

(12) United States Patent
Di Domenico et al.

(10) Patent No.: US 12,578,682 B2
(45) Date of Patent: Mar. 17, 2026

(54) HOROLOGICAL REGULATING MEMBER WITH FLEXIBLE GUIDE PROVIDED WITH MEANS FOR COMPENSATING FOR PRESSURE

(71) Applicant: The Swatch Group Research and Development Ltd, Marin (CH)

(72) Inventors: Gianni Di Domenico, Neuchâtel (CH); Baptiste Hinaux, Lausanne (CH); Mohammad Hussein Kahrobaiyan, Boudevilliers (CH); Jean-Luc Helfer, Le Landeron (CH); Pascal Winkler, St-Blaise (CH)

(73) Assignee: The Swatch Group Research and Development Ltd, Marin (CH)

( * ) Notice: Subject to any disclaimer, the term of this patent is extended or adjusted under 35 U.S.C. 154(b) by 321 days.

(21) Appl. No.: 18/348,719

(22) Filed: Jul. 7, 2023

(65) Prior Publication Data

US 2024/0027964 A1 Jan. 25, 2024

(30) Foreign Application Priority Data

Jul. 21, 2022 (EP) .................................... 22186288

(51) Int. Cl.
*G04B 17/04* (2006.01)
*G04B 17/24* (2006.01)

(52) U.S. Cl.
CPC ........... *G04B 17/045* (2013.01); *G04B 17/24* (2013.01)

(58) Field of Classification Search
CPC .............................. G04B 17/045; G04B 17/24
USPC .......................................................... 368/171
See application file for complete search history.

(56) References Cited

U.S. PATENT DOCUMENTS

2010/0128574 A1* 5/2010 Hillis .................. G04B 17/225 368/179
2022/0197218 A1* 6/2022 Kahrobaiyan ....... G04B 17/045

FOREIGN PATENT DOCUMENTS

EP 4 016 193 A1 6/2022
FR 410 898 A 6/1910

OTHER PUBLICATIONS

European Search Report issued Oct. 31, 2022 in European Application 22186288.1 filed on Jul. 21, 2022 citing documents 1 & 15-16 therein 3 pages (with English Translation of Categories of citied documents).

* cited by examiner

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A regulating member for a horological movement including an oscillating mass, for example a balance, a flexible guide including at least two flexible blades connecting a rigid support to the oscillating mass to enable the oscillating mass to make a rotary movement about a virtual pivot, the regulating member including an elastic device for compensating for the external pressure, the elastic compensation device being arranged in series with the rigid support, so as to connect the rigid support to means for securing the regulating member to the horological movement, the elastic compensation device being configured to adapt its stiffness according to the external pressure in order to compensate for the effect of external pressure on the regulating member.

11 Claims, 1 Drawing Sheet

HOROLOGICAL REGULATING MEMBER WITH FLEXIBLE GUIDE PROVIDED WITH MEANS FOR COMPENSATING FOR PRESSURE

CROSS-REFERENCE TO RELATED APPLICATION

This application claims priority to European Patent Application No. 22186288.1 filed on Jul. 21, 2022, the entire disclosure of which is hereby incorporated herein by reference.

TECHNICAL FIELD OF THE INVENTION

The invention relates to a horological regulating member with flexible guide provided with means for compensating for pressure.

TECHNOLOGICAL BACKGROUND

Most mechanical watches today are equipped with a spiral balance and a Swiss lever escapement mechanism. The spiral balance constitutes the time base of the watch. It is also referred to as a resonator or regulating member.

The escapement for its part has two main functions:

maintaining the to-and-fro motions of the resonator;

counting these to-and-fro motions.

An inertial element, a guide and an elastic return element are required in order to constitute a regulating member. Conventionally, a spiral spring acts as an elastic return element for the inertial element constituted by a balance. This balance is guided in rotation by pivots which generally rotate inside plain ruby bearings.

At the present time flexible guides are used as a spring part to form a virtual pivot. Flexible guides with virtual pivots make it possible to substantially improve horological resonators. The simplest are crossed blade guides, composed of two guide devices with straight blades that cross each other, in general perpendicularly. These two blades may be either three-dimensional in two different planes or two-dimensional in the same plane and are then as welded at their crossing point. However, RCC (standing for "Remote Centre Compliance") non-crossed blade guides, which have non-crossed straight blades, also exist. Such a resonator is described in the document EP 2911912, or in the documents EP14199039 and EP16155039.

However, such a mechanical resonator, during its operation, may be subjected to disturbances caused by changes in external parameters, which cause variations in frequency of the resonator. These parameters are for example the temperature, pressure, humidity, or the direction of gravity. The consequence of the variation in frequency of the resonator is an error in the measurement of time.

For example, the document CH 704687 describes a regulating member comprising a spiral spring and a member for correcting the position of the balance-spring stud to correct the deformations of the spiral spring due to temperature.

At the present time, there does not exist any regulating member provided with compensation means configured to compensate for variations in ambient pressure. Thus, when the pressure changes, for example because of the altitude, the regulating member loses in precision, since the difference in pressure modifies the aerodynamic friction of the regulating member. For example, an increase in pressure causes a decrease in the oscillation frequency of the regulating member.

SUMMARY OF THE INVENTION

The aim of the present invention is to overcome all or some of the drawbacks cited above by proposing a horological regulating member with flexible guide provided with means for compensating for pressure which are precise and adaptable to flexible guides.

For this purpose, the invention relates to a regulating member for a horological movement, the regulating member comprising an oscillating mass, for example a balance, and a flexible guide comprising at least two flexible blades connecting a rigid support to the oscillating mass to enable the oscillating mass to make a rotary movement about a virtual pivot.

The invention is remarkable in that the regulating member comprises an elastic device for compensating for the external pressure, the elastic compensation device being arranged in series with the rigid support, so as to connect the rigid support to means for securing the regulating member to the horological movement, the elastic compensation device being configured to adapt its stiffness according to the external pressure in order to compensate for the effect of external pressure on the regulating member.

By virtue of the invention, the prestressing means exert a variable force or torque on the elastic element of the elastic compensation device according to the pressure, so that the regulating member substantially keeps precise running despite significant changes to the pressure. This is because, when the pressure changes, the prestressing means modify the force or torque exerted on the elastic element, so that the stiffness of the flexible guide is modified. By modifying the stiffness of the flexible guide, the running of the regulating member is adjusted. Consequently, when the pressure changes, the elastic device is mechanically impacted to adjust the running of the flexible guide to this change.

This elastic element modifies the rigidity of the point of attachment and provides additional flexibility to the resonator. Thus the effective rigidity of the resonator comprises the rigidity of the flexible guide and the rigidity of the elastic element. The variable force or torque makes it possible to prestress the elastic element, preferably without prestressing the flexible guide and without moving the end of the flexible guide. By prestressing the elastic element, the rigidity thereof changes, while the rigidity of the flexible guide remains unchanged since it is not prestressed and its end does not move.

By modifying the rigidity of the elastic element, the rigidity of the resonator (rigidity of the flexible guide and rigidity of the elastic element) changes, which consequently modifies the running of the resonator. The elastic element preferably being more rigid than the flexible guide, the share of the rigidity of the elastic element in the overall rigidity is less than that of the flexible guide. Consequently, a modification of the rigidity of the elastic element modifies the rigidity of the whole of the resonator, and consequently adjusts its running finely, which makes it possible to precisely adjust the frequency of our time base. Great precision in the maintenance of running according to pressure is thus obtained.

According to a particular embodiment of the invention, the elastic compensation device comprises an elastic element arranged between the support and the securing means, as well as prestressing means for applying a variable force or torque to the elastic element according to the external pressure.

According to a particular embodiment of the invention, the prestressing means comprise an aneroid capsule the volume of which varies according to the external pressure, so as to transmit a variable force or torque according to the external pressure.

According to a particular embodiment of the invention, the prestressing means comprise a spring part connected to the movable support and to the aneroid capsule, the spring part transmitting the force or torque to the elastic element by means of the movable support.

According to a particular embodiment of the invention, the aneroid capsule comprises a movable wall and a non-movable wall connected by at least one spring.

According to a particular embodiment of the invention, the spring part comprises a single flexible blade and a translation table arranged in series between the aneroid capsule and the movable support.

According to a particular embodiment of the invention, the movable wall is connected to the translation table of the flexible part.

According to a particular embodiment of the invention, the elastic element comprises a pair of non-crossed blades connecting the movable support to the securing means.

According to a particular embodiment of the invention, the prestressing means are arranged between the non-crossed blades of the elastic element.

According to a particular embodiment of the invention, the two main blades of the flexible guide are crossed.

According to a particular embodiment of the invention, the regulating member extends substantially in the same plane, except for the oscillating mass.

According to a particular embodiment of the invention, the elastic element has rigidity greater than the rigidity of the flexible guide, preferably at least five times greater, or even at least ten times greater.

The invention further relates to a horological movement including such a regulating member.

BRIEF DESCRIPTION OF THE FIGURES

The aims, advantages and features of the present invention will appear upon reading several embodiments given only as non-limiting examples, with reference to the appended drawings wherein.

DETAILED DESCRIPTION OF THE INVENTION

Figure 1:
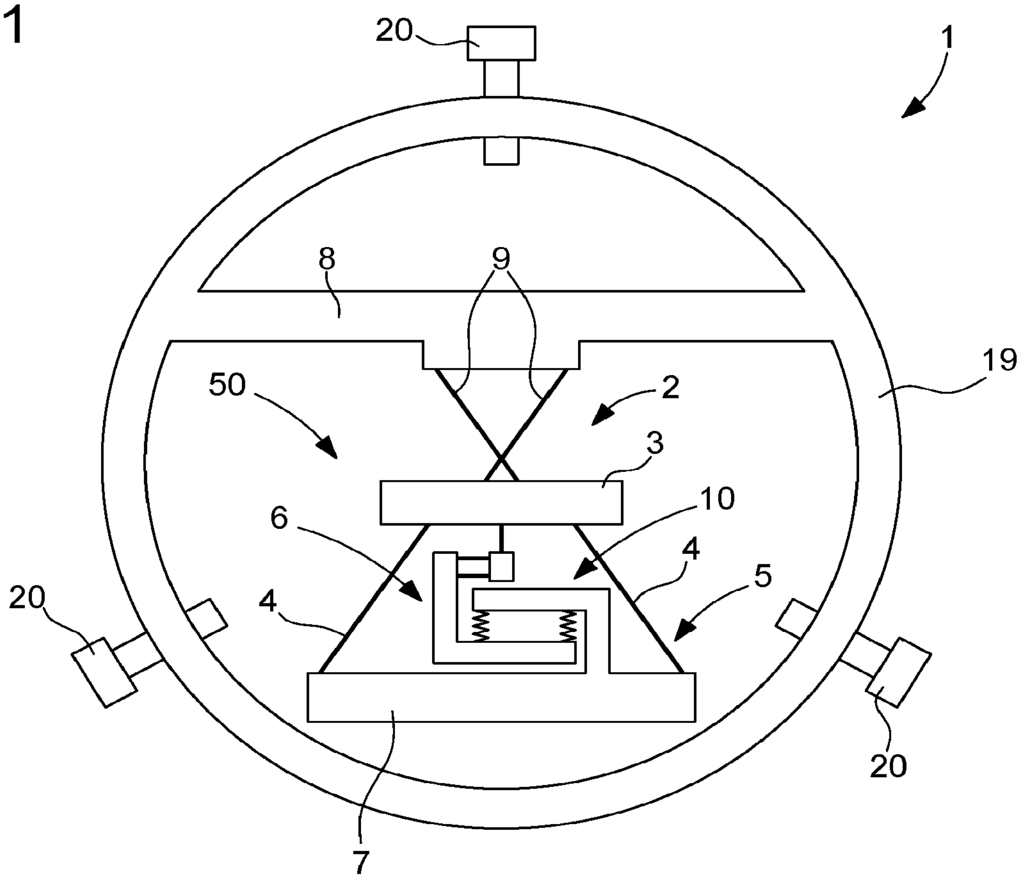
FIG. 1 schematically shows a plan view of an embodiment of a regulating member provided with means for compensating for the pressure, and FIG. 2 schematically shows an enlarged plan view of the compensation means of the embodiment of the invention of FIG. 1.
Figure 2:
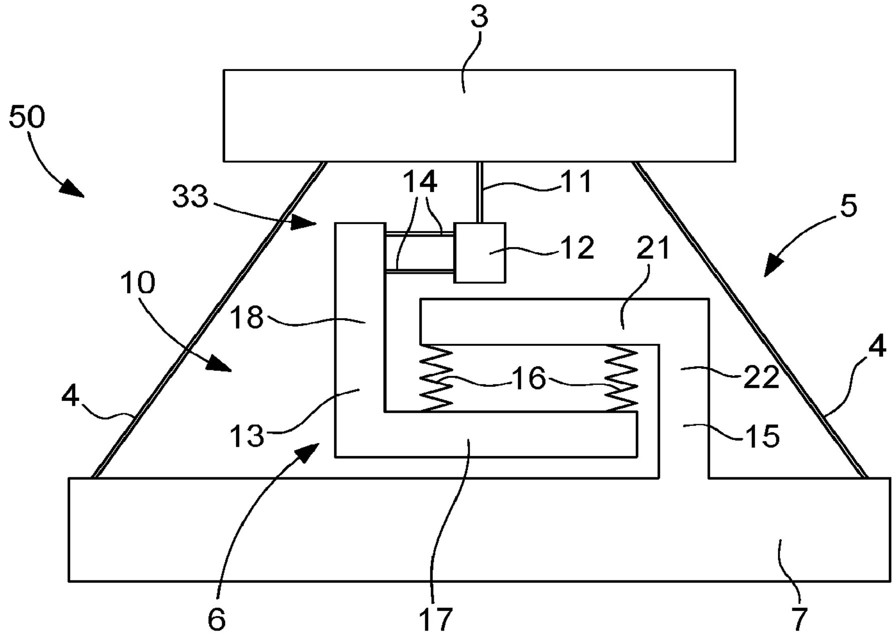

FIGS. 1 and 2 show an embodiment of a regulating member 1 according to the invention, the regulating member 1 comprising an elastic device 50 configured for compensating for a variation in pressure exerted on the regulating member 1. Such regulating members 1 are intended to be arranged in a horological movement to regulate it.

In this embodiment, the regulating member 1 comprises a flexible guide 2 and an oscillating mass 19. An oscillating mass may for example be annular in shape or an arm in the shape of a bone.

The oscillating mass 19 is here annular in shape, and comprises a branch 8 passing through the ring, the branch 8 being arranged to divide the ring into two parts, a first part comprising one third of the ring, and a second part comprising two thirds of the ring. Furthermore, the oscillating mass 19 comprises screws 20 adjusting the unbalance, here three screws. The adjustment screws 20 are distributed angularly around the ring, and pass through the ring in the direction of the centre of the ring.

Preferably, the regulating member 1 extends substantially in the same plane, except for the oscillating mass 19, which oscillates in a parallel plane, in a rotary movement about the virtual pivot, for example above the flexible guide 2.

The flexible guide 2 comprises two main flexible blades 9, and a rigid support 3. The flexible guide 2 extends along a main symmetry axis. The main flexible blades 9 are joined firstly to the rigid support 3 of the flexible guide 2, and secondly to the branch 8 of the oscillating mass 19.

The two main blades 9 of the flexible guide 2 are crossed, preferably straight and with the same length. The crossing point of the main flexible blades 9 is closer to the rigid support 3 than to the branch 8. The main flexible blades 9 are centred, so that the main symmetry axis passes through a straight line dividing the ring into two.

The flexible guide 2 is disposed inside the ring in the larger second part.

The rigid support 3 has a substantially parallelepipedal elongate body.

According to the invention, the regulating member 1 comprises an elastic device 50 for compensating for the pressure, the elastic device being arranged in series with the rigid support 3 so as to connect the rigid support 3 to means 7 for securing the regulating member 1 to the horological movement.

The elastic compensation member 50 is configured to adapt its stiffness according to the variations in the surrounding pressure in order to compensate for the effect of these variations on the regulating member 1. The elastic compensation device 50 preferably has stiffness greater than the pair of main flexible blades 9.

The elastic compensation device 50 comprises an elastic element 5 arranged between the rigid support 3 and the securing means 7, as well as prestressing means 6 for applying a variable force or torque to the elastic element 5 and the rigid support 3 according to the pressure.

On FIG. 2, the elastic element 5 comprises a pair of non-crossed blades 4 connecting the rigid support 3 to the securing means 7. The non-crossed blades 4 extend from the rigid support 3, on the side opposite to the side of the main flexible blades 9, to the securing means 7 while separating from each other.

The prestressing means 6 are disposed between the flexible blades of the pair of non-crossed blades 4.

The prestressing means 6 comprise a spring part exerting the variable force or torque on the rigid support 3. Thus the stiffness of the elastic device is modified since the prestressing means 6 modify the stiffness of the non-crossed blades 4. The spring part is furthermore configured to undergo a variable force or torque that is transmitted to the elastic element 5.

To transmit a variable force or torque according to the external pressure to the spring part, the prestressing means 6 comprise an aneroid capsule 10.

Such a capsule is generally used for measuring atmospheric pressure. For this purpose, the capsule comprises a space at least partly void of air, and comprises an elastic return element of the spring type in the space to hold a movable wall of the capsule. Thus, when the external pressure increases, the capsule is compressed, and when the external pressure decreases, the capsule is enlarged.

On FIG. 2, the aneroid capsule 10 comprises a volume that is variable according to the external pressure.

For this purpose, the aneroid capsule 10 comprises a movable wall 13 and a non-movable wall 15 connected by at least one spring 16. An airtight chamber, not shown on the figures, makes it possible to at least partly create the vacuum inside the movable 13 and non-movable 15 walls.

The non-movable wall 15 is firmly connected to the securing means 7. The non-movable wall 15 is in an L shape, the large segment 21 of which is substantially parallel to the securing means 7 and to the support, and the small segment 22 of which is connected to the securing means 7 perpendicularly to the large segment 21.

The movable wall 13 is in an L shape, the movable wall 13 being arranged in opposite orientations with respect to the non-movable wall 15, so that the large segments 17, 21 of the Ls are substantially facing each other, and so that the small segments 18, 22 of the Ls are substantially facing each other.

The prestressing means 6 furthermore comprise at least one spring, here two springs 16 connecting the large segments 17, 21 on the inside, which form the elastic return element of the aneroid capsule. According to the pressure exerted on the movable wall 13, the springs 16 extend, in particular when the pressure drops, or contract, in particular when the pressure increases. Thus they move the movable wall 13 closer to or further away from the non-movable wall 15.

The spring part of the prestressing means 6 is connected to the movable support 3 and to the aneroid capsule 10, the spring part transmitting the force or torque from the aneroid capsule 10 to the elastic element 5 by means of the movable support 3.

The spring part comprises a single flexible blade 11 perpendicularly connected to the rigid support 3 on the same side as the non-crossed blades 4. The single flexible blade 11 makes it possible to transmit the prestressing force to the movable support 3 while leaving the movable support 3 free to turn.

The spring part also comprises a translation table 33 arranged in series between the movable wall 13 and the single flexible blade 11. The translation table 33 comprises two substantially parallel flexible blades 14 and a movable element 12. The flexible blades 14 connect the movable element 12 to the interior side of the small segment of the L of the movable wall 13, parallel to the large segments of the Ls.

The function of the translation table 33 is to transform the separation of the capsule into a prestressing force on the movable support 3.

The movable element 12 is a parallelepiped connected to the rigid support 3 by the single flexible blade 11, the two flexible blades 14 of the translation table 33 being arranged perpendicularly to the single flexible blade 11. The single flexible blade 11 extends from the top side of the movable element 12 as far as the middle of the bottom side of the rigid support 3.

When the pressure changes, the movable wall 13 moves closer to or further away from the non-movable wall 15 and the rigid support 3. Thus the movable element 12 of the translation table is subject to a greater or lesser thrust force towards the rigid support 3, this force being transmitted to the rigid support 3 via the single flexible blade 11.

Thus the prestressing means 6 exert a variable separation force between the rigid support 3 and the securing means 7. Consequently the stiffness of the elastic element 5 varies, and makes it possible to adapt the running of the balance to the external pressure conditions to keep the precision of the regulating member.

For example, when the pressure increases, the movable wall 13 moves closer to the non-movable wall 15. This moving closer gives rise to an increase in the separation force between the rigid support 3 and the securing means 7, which is exerted by the prestressing means 6. Thus the stiffness of the elastic element 5, and therefore that of the blades 4 of the pair of non-crossed blades, is increased.

On the other hand, when the pressure decreases, the movable wall 13 moves further away from the non-movable wall 15. This moving away gives rise to a decrease in the separation force between the rigid support 3 and the securing means 7, which is exerted by the prestressing means 6. Thus the stiffness of the elastic element 5, and therefore that of the pair of non-crossed blades 4, is decreased.

The invention further relates to a horological movement, not shown on the figures, the movement comprising a regulating member 1 as described previously.

Naturally the invention is not limited to the embodiments described with reference to the figures and variants could be envisaged without departing from the scope of the invention.

The invention claimed is:

1. A regulating member for a horological movement comprising:

an oscillating mass, a flexible guide comprising at least two flexible blades connecting a rigid support to the oscillating mass to enable the oscillating mass to make a rotary movement about a virtual pivot, wherein the regulating member comprises an elastic compensating device arranged in series with the rigid support, so as to connect the rigid support to the horological movement, the elastic compensating device comprises an elastic element arranged between the rigid support and the horological movement, as well as a prestressing device for applying a variable force or torque to the elastic element according to an external pressure such that the elastic element adapts its stiffness according to the external pressure in order to compensate for an effect of the external pressure on the regulating member.

2. The regulating member according to claim 1, wherein the prestressing device comprises an aneroid capsule, a volume of which varies according to the external pressure, so as to transmit the variable force or torque according to the external pressure.

3. The regulating member according to claim 2, wherein the prestressing device comprises a spring part connected to the rigid support and to the aneroid capsule, the spring part transmitting the force or torque to the elastic element with the rigid support.

4. The regulating member according to claim 3, wherein the aneroid capsule comprises a movable wall and a non-movable wall connected by at least one spring.

5. The regulating member according to claim 4, wherein the spring part comprises a single flexible blade and a translation table arranged in series between the aneroid capsule and the rigid support.

6. The regulating member according to claim 5, wherein the movable wall is connected to the translation table of the spring part.

7. The regulating member according to claim 1, wherein the elastic element comprises a pair of non-crossed blades connecting the rigid support to the horological movement.

8. The regulating member according to claim 7, wherein the prestressing device is arranged between the non-crossed blades of the elastic element.

9. The regulating member according to claim 1, wherein the at least two flexible blades of the flexible guide are crossed.

10. The regulating member according to claim 1, wherein the regulating member extends in the same plane, except for the oscillating mass.

11. A horological movement comprising a regulating member according to claim 1.

* * * * *